United States Patent
Roberge et al.

(10) Patent No.: US 12,004,450 B2
(45) Date of Patent: Jun. 11, 2024

(54) CLEANING FAN FOR A FRUIT HARVESTER

(71) Applicant: CNH Industrial America LLC, New Holland, PA (US)

(72) Inventors: Martin Roberge, Saskatoon (CA); Rogelio Chovet, De Pinte (BE)

(73) Assignee: CNH Industrial America LLC, New Holland, PA (US)

( * ) Notice: Subject to any disclaimer, the term of this patent is extended or adjusted under 35 U.S.C. 154(b) by 618 days.

(21) Appl. No.: 17/281,099

(22) PCT Filed: Sep. 27, 2019

(86) PCT No.: PCT/EP2019/076306
§ 371 (c)(1),
(2) Date: Mar. 29, 2021

(87) PCT Pub. No.: WO2020/065065
PCT Pub. Date: Apr. 2, 2020

(65) Prior Publication Data
US 2021/0386018 A1 Dec. 16, 2021

(30) Foreign Application Priority Data
Sep. 28, 2018 (EP) .................................... 18315030

(51) Int. Cl.
*A01D 46/28* (2006.01)
(52) U.S. Cl.
CPC .................. *A01D 46/285* (2013.01)
(58) Field of Classification Search
CPC .............................. A01D 46/285; A01D 46/28
See application file for complete search history.

(56) References Cited

U.S. PATENT DOCUMENTS

| | | | | |
|---|---|---|---|---|
| 4,642,977 A | * | 2/1987 | Ramacher | A01D 51/00 |
| | | | | 56/16.5 |
| 5,001,893 A | * | 3/1991 | Stanley | A01D 51/002 |
| | | | | 56/16.5 |

(Continued)

FOREIGN PATENT DOCUMENTS

| | | |
|---|---|---|
| BE | 554199 A | 1/1957 |
| CA | 1115180 A | 12/1981 |

(Continued)

OTHER PUBLICATIONS

International Search Report and Written Opinion for PCT Application No. PCT/EP2019/076306 dated Dec. 3, 2019 (12 pages).

(Continued)

*Primary Examiner* — Abigail A Risic
(74) *Attorney, Agent, or Firm* — Peter K. Zacharias; Rebecca L. Henkel; Rickard K. DeMille

(57) ABSTRACT

A cleaning fan for use in a cleaning system of a fruit harvester includes a housing and a rotor disposed within the housing. The rotor includes a hub and a plurality of blades. The cleaning fan is configured as a mixed flow fan combining high-volume flow characteristics with increased pressure delivery characteristics. The hub is a frustroconical shaped hub with an axis of rotation, a smaller diameter inlet end, and a larger diameter outlet end. Each of the blades is attached to the hub and curves from the inlet end toward the outlet end, relative to a direction of rotation of the rotor, whereby air is blown during operation both axially and radially.

13 Claims, 7 Drawing Sheets

(56) References Cited

U.S. PATENT DOCUMENTS

| | | | |
|---|---|---|---|
| 7,409,743 B2 * | 8/2008 | Di Anna | A01D 41/1252 |
| | | | 15/340.1 |
| 9,795,913 B1 * | 10/2017 | Flora | A01D 51/002 |
| 2021/0051851 A1 * | 2/2021 | Rico | A01D 46/285 |

FOREIGN PATENT DOCUMENTS

| | | |
|---|---|---|
| CN | 205762334 U | 12/2016 |
| DE | 202004013020 U1 | 12/2004 |
| EP | 1062856 A1 | 12/2000 |
| EP | 2175711 B1 | 6/2012 |
| FR | 2368215 A1 | 5/1978 |
| FR | 2398450 A1 | 2/1979 |
| FR | 2408292 A1 | 6/1979 |
| FR | 2686530 A1 | 7/1993 |
| LU | 32528 A1 | 11/1953 |
| SU | 1367902 A1 | 1/1988 |
| WO | 2009144257 A2 | 12/2009 |
| WO | 2012/126610 A1 | 9/2012 |

OTHER PUBLICATIONS

Extended European Search Report for European Application No. 18315030.9 dated Mar. 22, 2019 (6 pages).

* cited by examiner

CLEANING FAN FOR A FRUIT HARVESTER

BACKGROUND OF THE INVENTION

The present invention relates to harvesters for harvesting fruit, such as grapes or olives, and, more specifically to cleaning fans used in such harvesters.

A fruit harvester in the form of a self-propelled grape harvester includes a chassis which carries an onboard power plant and several onboard sub-systems for processing the grapes. The grape harvester straddles and traverses along at least one row of grape vines, and a picking system separates the grapes and Material Other than Grapes (referred to as "MOG", such as leaves, stems, wood debris, etc.) from the vines. The picking system typically is in the form of "pivotal strikers" or "trunk shakers". The pivotal strikers can include a double bank of flexible horizontal rods that strike and shake the vine to remove the fruit. The trunk shakers can include parallel skiis (flexible, pre-compressed parabolic polymer rods) oriented on edge that move from side to side to impart horizontal vibration to the vines for removal of the grapes and MOG.

A conveying system transports the grapes and MOG to a cleaning system, which in turn separates the grapes from the MOG and cleans the grapes. The cleaning system can include one or more cleaning fans, a sorting table, and a destemmer.

The sorting table can include a combination of conveying rollers and sorting rollers, which can be optimized for different sizes of grapes. The grapes which are dropped on the conveying rollers are transported to the sorting rollers, where the grapes are sorted from the MOG. The sorting rollers can be configured with an adjustable gap between the sorting rollers such that the grapes fall through and the MOG is transported to the end of the sorting table and discharged behind the harvester.

The destemmer removes the central stalk or stems from the grapes in a cluster/bunch of grapes. A destemmer can include a box or box-like structure which is carried by and moves in an oscillating manner within a frame. The berries (grapes) are supplied to the inlet of the box-like structure, which is shook (aggressively) using an eccentric drive to separate the berries from the stalk and stems. The berries are expelled through holes formed in the in the bottom and top walls of the box, and the rafle (central stalk of the bunch) and stems are expelled at the outlet of the box.

The one or more cleaning fans can be positioned upstream in the cleaning system, and remove larger MOG from the stream of crop material by suction and discharge the larger MOG, such as behind the harvester. Cleaning fans are typically configured as centrifugal fans. A centrifugal fan is a radially operating fan which provides good pressure increase characteristics at the fan outlet, but lacks in mass flow characteristics. The centrifugal cleaning fan receives air axially into the fan inlet, compresses the air, and discharges the air radially from the fan outlet. A centrifugal fan also is typically noisy during operation. Since modern vineyards may also likely be located in or near to residential neighborhoods, a noisy cleaning fan can be objectionable.

SUMMARY OF THE INVENTION

The invention in one form is directed to a cleaning fan for use in a cleaning system of a fruit harvester. The cleaning fan includes a housing and a rotor disposed within the housing. The rotor includes a hub and a plurality of blades. The cleaning fan is characterized in that the cleaning fan is configured as a mixed flow fan combining high-volume flow characteristics with increased pressure delivery characteristics. The hub is a frustroconical shaped hub with an axis of rotation, a smaller diameter inlet end and a larger diameter outlet end. Each of the blades is attached to the hub and curves from the inlet end toward the outlet end, relative to a direction of rotation of the rotor, whereby air is blown during operation both axially and radially.

In another form of the invention, each of the blades has a proximal end attached to the hub at or near the inlet end, and each of the blades curves in a radial manner toward the outlet end.

In another form of the invention, each of the blades terminates at or near the outlet end of the hub.

In another form of the invention, each of the blades curves as a continuous curve or has a plurality of adjoining discrete curve segments.

In another form of the invention, each of the blades rotates through between approximately 75° to 90° of rotation, preferably approximately 83° of rotation, measured on a radial coordinate system and viewed parallel to the axis of rotation of the hub.

In yet another form of the invention, each of the blades has an inlet angle of between approximately 40° to 50°, preferably approximately 44°, and an outlet angle of between approximately 40° to 55°, preferably approximately 48°, relative to and viewed orthogonal to the axis of rotation of the hub.

In yet another form of the invention, the rotor has a hub expansion ratio of between 2.6:1 and 2.8:1, preferably approximately 2.68:1, and the blades have a contraction ratio of between 1.75:1 and 1.95:1, preferably approximately 1.85:1.

In yet another form of the invention, the cleaning fan operates at a noise level of approximately 75 to 85 dB, preferably below 85 dB.

In yet another form of the invention, the housing includes an inlet and an outlet, and an air flow through the cleaning fan at each of the housing inlet and the housing outlet is approximately parallel to the axis of rotation of the hub.

In still another form of the invention, the housing includes a circular shaped inlet and an annular shaped outlet.

In still another form of the invention, the housing is configured as a two part housing including an inlet housing portion with the housing inlet and an outlet housing portion with the housing outlet.

In still another form of the invention, the outlet housing portion includes an inner annular housing part which lies closely adjacent to the larger diameter outlet end of the hub, and an outer annular housing part which is concentric with the inner annular housing part and defines the annular shaped outlet of the housing.

In a still further form of the invention, the cleaning fan includes a material shredder located at or near the housing inlet.

In a still further form of the invention, the material shredder is either a) coupled with and driven by the hub, or b) detached and separately driven from the hub.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
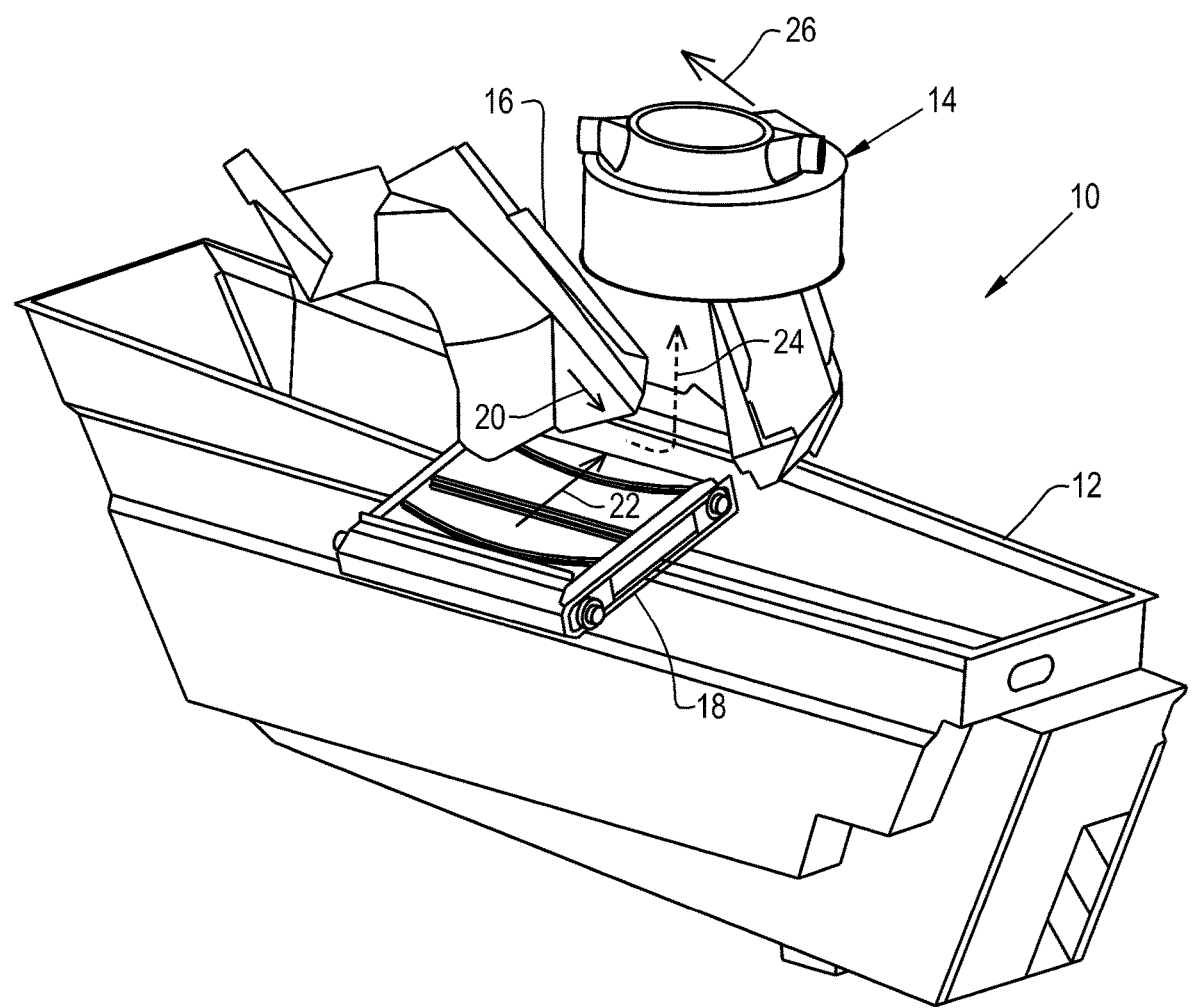
FIG. 1 is a perspective view of a portion of a fruit harvester, including a conventional a cleaning fan.

Referring now to the drawings, and more particularly to FIG. 1, there is shown a portion of a conventional fruit harvester 10 in the form of a grape harvester. The fruit harvester 10 can be variously configured for different applications, such as harvesting olives. The fruit harvester 10 can include a chassis 12 carrying multiple different sub-systems and components, such as a cleaning fan 14 forming part of a cleaning system (not numbered). The cleaning system can include other components, such as a sorting table and a destemmer (not shown in FIG. 1).

As indicated above, the cleaning fan 14 removes larger MOG from the stream of crop material by suction and discharges the larger MOG from the harvester 10. When configured as a grape harvester, the grape bunches or clusters are removed from the grape vines, conveyed rearwardly and upwardly by suitable conveying mechanisms (not shown), and discharged from a discharge spout 16 onto a pair of lateral conveyors 18. The lateral conveyors 18 in turn convey the grape clusters to other downstream processing sub-systems, such as a pair of sorting tables (not shown) respectively located under the distal or discharge end of each lateral conveyor 18. Only a single lateral conveyor 18 is shown in FIG. 1 for brevity, and the other lateral conveyor (not shown) extends and conveys laterally opposite from the lateral conveyor 18.

Figure 2:
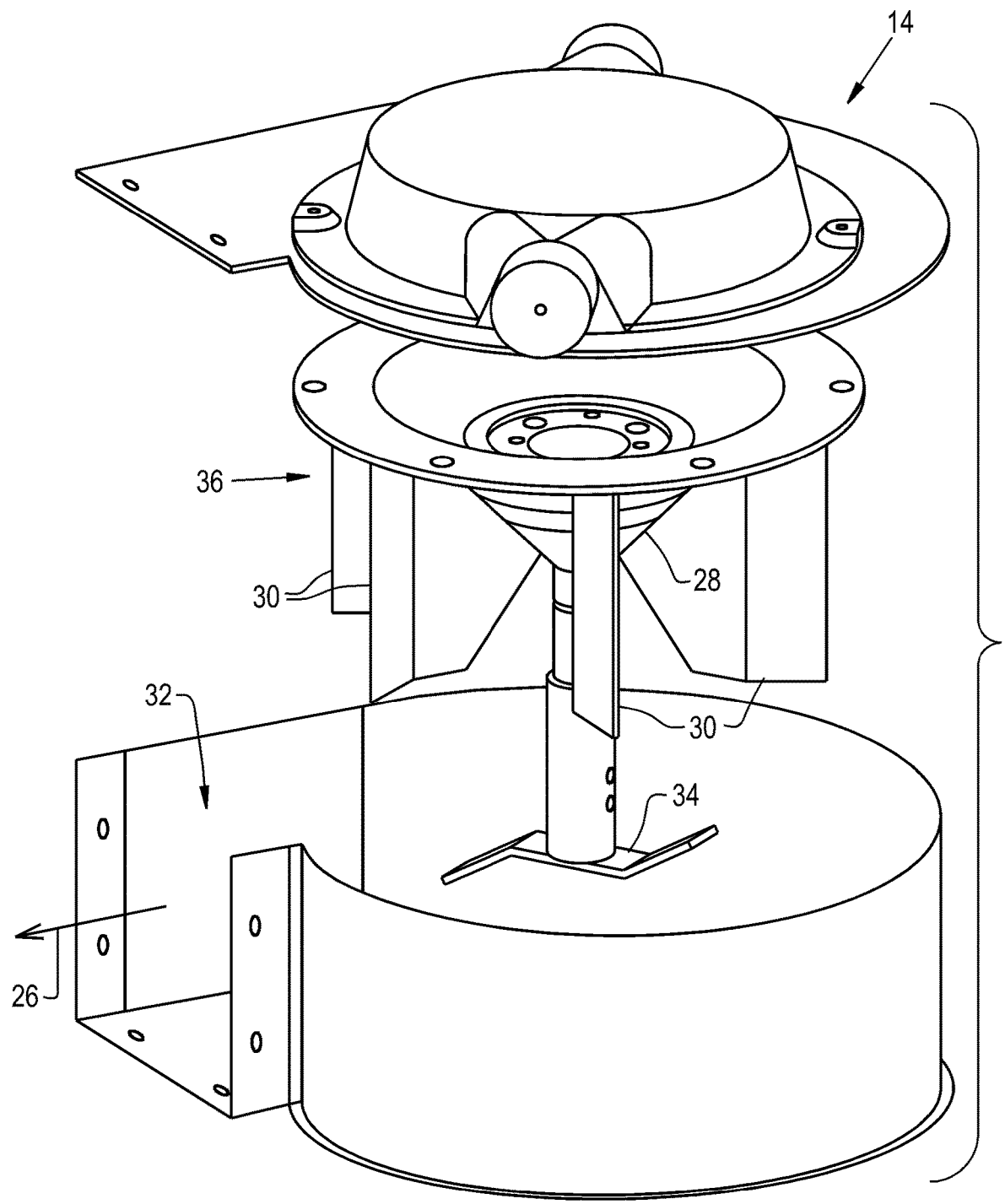
FIG. 2 is an exploded perspective view of the cleaning fan shown in FIG. 1.

Referring to FIG. 2, the flow direction of the grape bunches from the discharge spout 16 is indicated by the directional arrow 20. The grape bunches fall down onto the lateral conveyors 18 and travel upwardly, as indicated by arrow 22, with the grapes falling off the end of the lateral conveyors 18 into a storage bin (or an optional destemmer) and some or all of the MOG being pulled upward into the cleaning fan 14 as indicated by arrow 24. The MOG can be chopped using a chopping blade 34, and is then discharged from the radial discharge outlet 32 of the centrifugal cleaning fan 14 as indicated by arrow 26.

Figure 3:
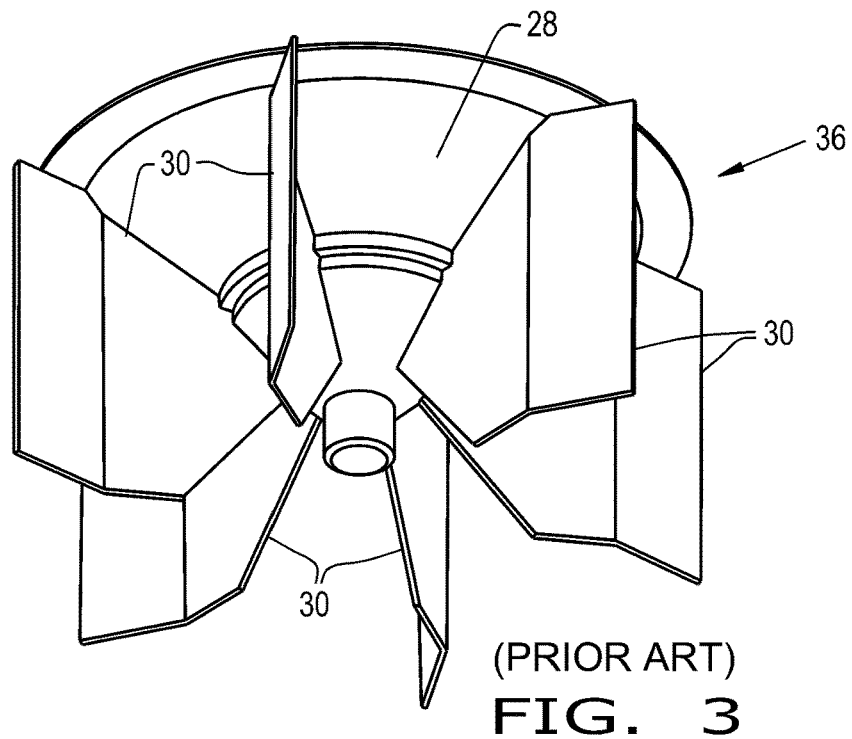
FIG. 3 is a perspective view of a rotor used in the cleaning fan shown in FIGS. 1 and 2.
Figure 4:
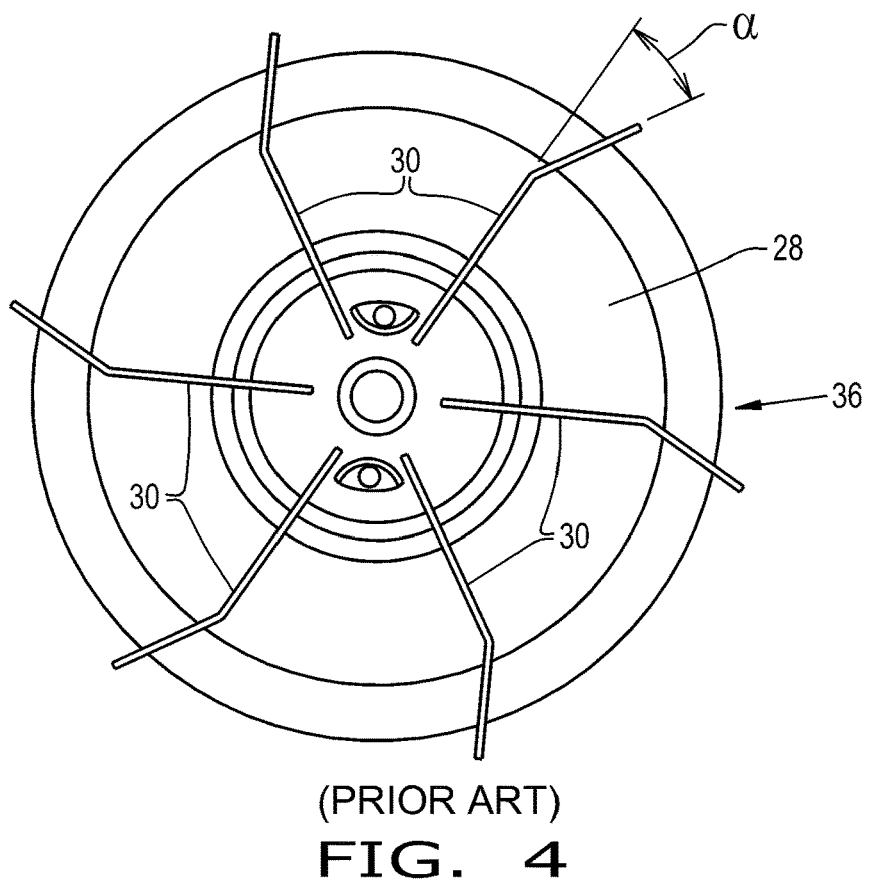
FIG. 4 is a plan view of the rotor shown in FIG. 3.

Referring now to FIGS. 2-4, the rotor 36 of the conventional cleaning fan 14 will be described in greater detail. The rotor 36 includes a conic hub 28 and a plurality (e.g., six) forwardly bent blades 30. The air is sucked in axially, split using the conic hub 28, and compressed and discharged purely radially into the discharge outlet 32. The expansion ratios of the conic hub 28 and the blades 30 are 7.53:1 and 1.73:1, respectively. The exit angle α of the bent blades, measured on a radial coordinate system, is 30 degrees (see FIG. 4).

Figure 5:
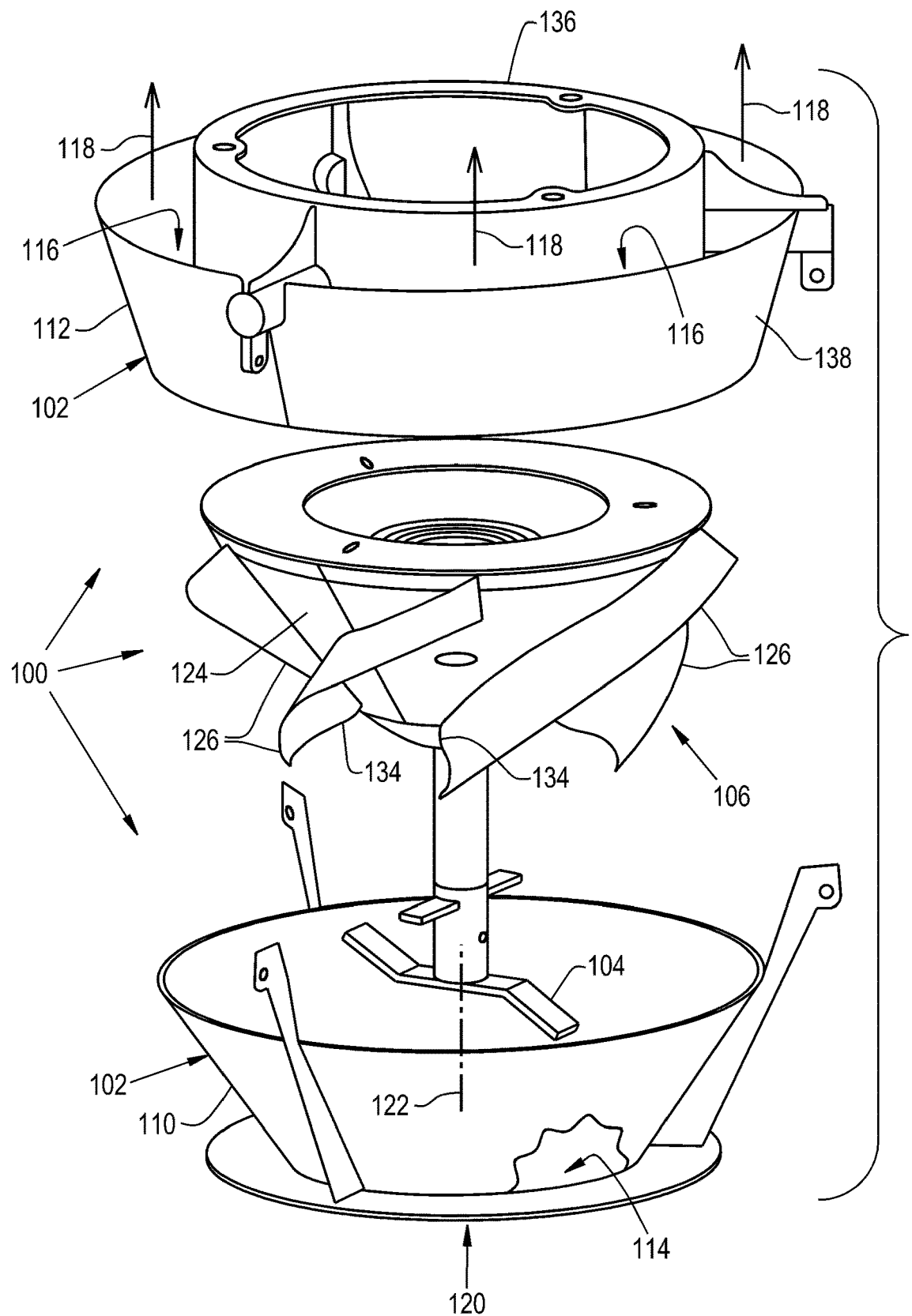
FIG. 5 is an exploded perspective view of an embodiment of a cleaning fan of the present invention, which can be used with a fruit harvester such as shown in FIG. 1.
Figure 6:
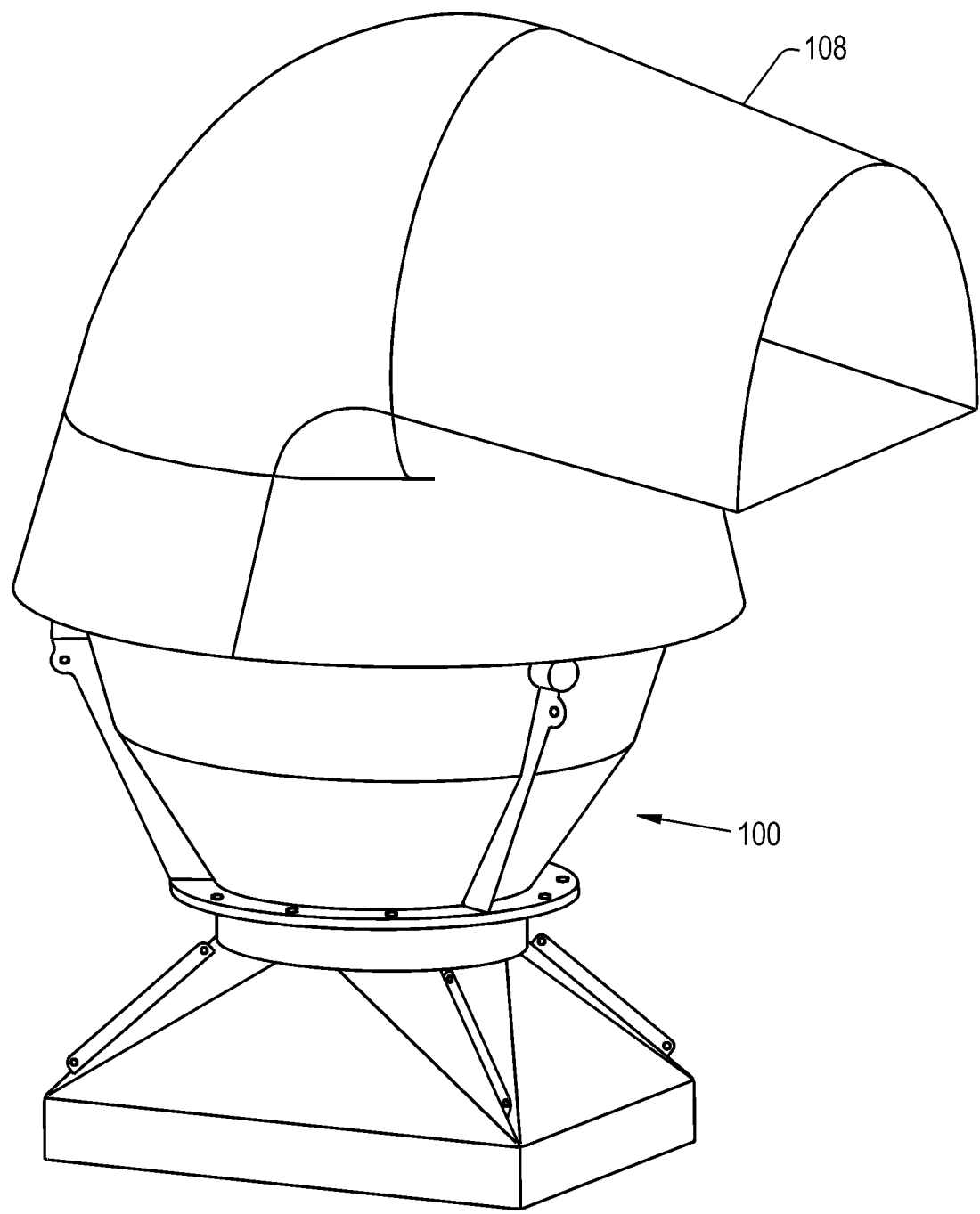
FIG. 6 is a perspective view of the cleaning fan shown in FIG. 5 when in an assembled state.
Figure 7:
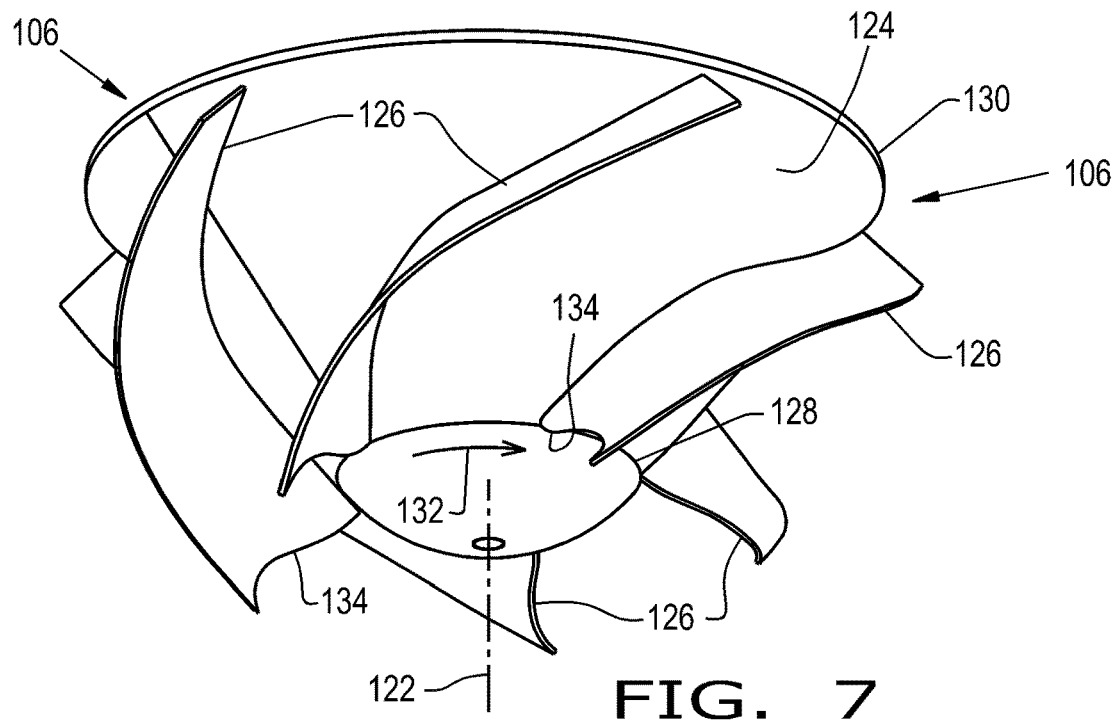
FIG. 7 is a perspective view of the rotor shown in FIG. 5.

Referring now to FIGS. 5 and 6, there is shown an embodiment of a cleaning fan 100 of the present invention. The cleaning fan 100 can be used with the fruit harvester 10 shown in FIG. 1, in place of the cleaning fan 14. The cleaning fan 100 generally includes an outer housing 102, a material shredder 104, a rotor 106, and a discharge duct 108.

The housing 102 is constructed as a two-piece housing allowing the rotor 106 to be placed therein, including an inlet housing portion 110 and an outlet housing portion 112. The inlet housing portion 110 includes an open circular inlet 114 (partially visible with part of the housing portion 110 fragmented away in FIG. 5) allowing MOG to be drawn axially into the rotor 106. The outlet housing portion 112 includes an annular outlet 116 of sufficient cross sectional area to allow discharge of the shredded MOG. In the embodiment shown, the outlet housing portion 112 includes an inner annular housing part 136 which lies closely adjacent to the larger diameter outlet end 130 of the hub 124, and an outer annular housing part 138 which is concentric with the inner annular housing part 136 and defines the annular shaped outlet 116 (see FIG. 5). The flow direction 118 of the MOG from the outlet 116 is generally parallel to the flow direction 120 of the MOG entering the inlet 114 to the inlet housing portion 110, and both flows are generally parallel to the axis of rotation 122 of the rotor 106.

The cleaning fan 100 is configured as a mixed flow fan, combining the high-volume flow characteristics of an axial fan with the increased pressure delivery characteristics of a centrifugal fan. The rotor 106 provides the cleaning fan 100 with the mixed flow characteristics, and includes a frustro-conical shaped hub 124 and a plurality of blades 126. The hub 124 has a smaller diameter inlet end 128 and a larger diameter outlet end 130. Each of the blades 126 is attached to the hub 124 and curves from the inlet end 128 toward the outlet end 130, relative to a direction of rotation 132 of the rotor 106, whereby air is blown during operation both axially and radially. This combination of axial and radial forces on the air passing through the rotor blades 126 maintains a high flow rate, increasing the air dynamic pressure while decreasing the static pressure at the outlet of the fan 100, with quiet operating performance.

Each of the blades 126 has a proximal end 134 attached to the hub 124 at or near the inlet end 128, and each of the blades 126 terminates at or near the outlet end 130 of the hub 124. The blades 126 curve in a radial manner toward the outlet end 130. In the illustrated embodiment, each of the blades 126 curves as a continuous curve. However, it may also be possible to form the blades 126 with a plurality of adjoining discrete linear segments which generally define a curve, such as shown on the one blade with dashed lines 126A illustrating 4 adjoining linear segments in FIG. 9.

Figure 8:
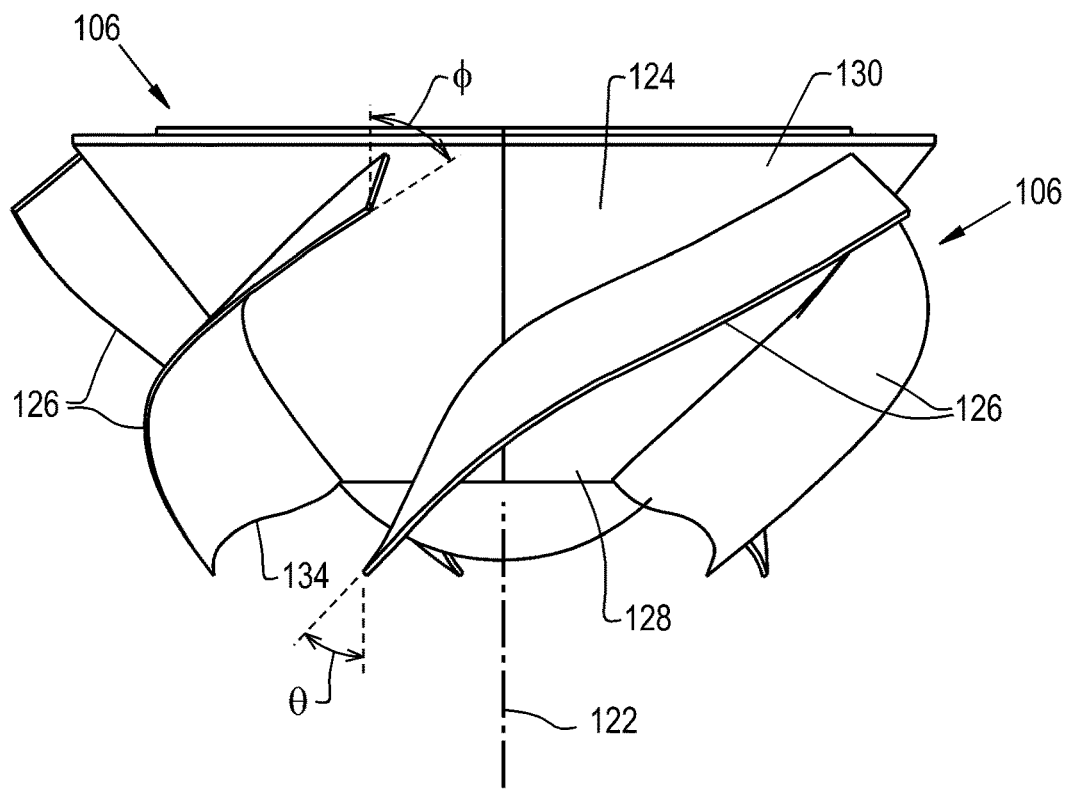
FIG. 8 is a side view of the rotor shown in FIG. 7.
Figure 9:
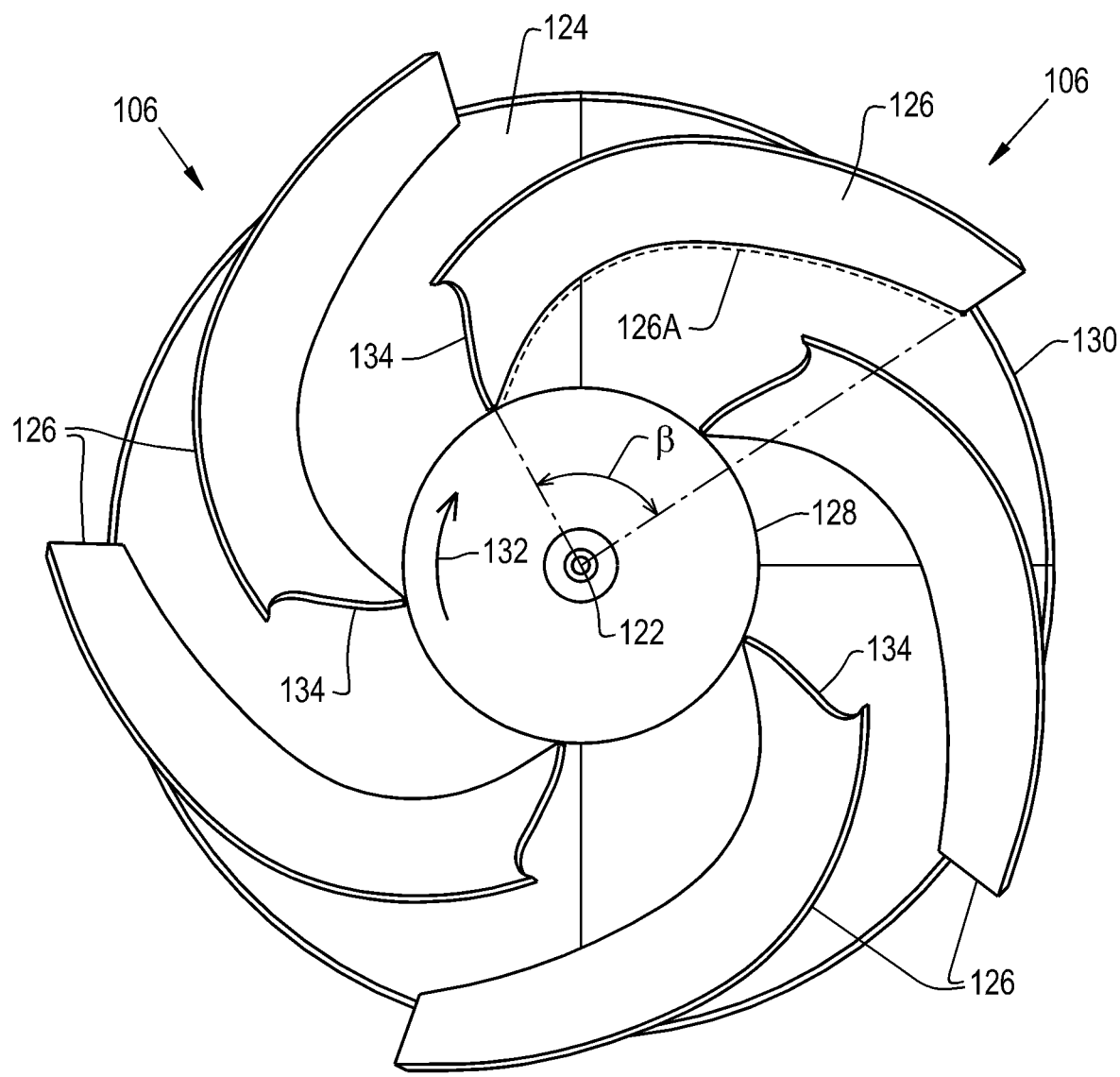
FIG. 9 is a plan view of the rotor shown in FIGS. 7 and 8.

Each of the blades 126 rotates through an angle β of between approximately 75° to 90° of rotation, preferably approximately 83° of rotation, measured on a radial coordinate system and viewed parallel to the axis of rotation of the hub (see FIG. 9). Moreover, each of the blades 126 has an inlet angle ϴ of between approximately 40° to 50°, preferably approximately 44°, and an outlet angle Φ of between approximately 40° to 55°, preferably approximately 48°, relative to and viewed orthogonal to the axis of rotation of the hub (see FIG. 8).

When the cleaning fan 100 is configured as described above, the rotor 106 has a hub expansion ratio of between 2.6:1 and 2.8:1, preferably approximately 2.68:1, and the blades have a contraction ratio of between 1.75:1 and 1.95:1, preferably approximately 1.85:1. The cleaning fan 100 operates at a noise level of approximately 75 to 85 dB, preferably below 85 dB. This noise level is in contrast with a fruit harvester including a conventional centrifugal cleaning fan, which typically operates at a noise level of about 95 dB, and can be objectionable to neighbors.

The cleaning fan 100 can also include an optional material shredder 104 which can be located at or near the housing inlet 114. In the embodiment shown, the material shredder 104 is coupled with and driven by the hub 124. However, it may also be possible to provide a material shredder which is detached from the hub 124, and separately driven from the hub using another power source such as an electric or hydraulic motor. When the material shredder is separate from the hub 124, it may then be separately controlled and driven at a different rotational speed than the hub 124.

During operation of grape harvester, grapes bunches including stalks and stems are conveyed rearwardly and upwardly on the harvester for further processing. The cleaning fan 100 is positioned at a suitable location toward the upstream end of the cleaning system, such as at the discharge location onto the upstream ends of the two lateral conveyors 18. The cleaning fan draws the heavier MOG toward the inlet 114 and the optional material shredder shreds and chops the MOG into smaller pieces. The shredded MOG is drawn into the rotor 106 in a direction generally parallel to the axis of rotation 122 of the rotor 106. The air including the shredded MOG is blown both axially and radially as it passes through the hub 124 and blades 126, thus providing a cleaning fan with mixed flow characteristics. The blown air and MOG is then discharged from the outlet 116 in a direction generally parallel to the axis of rotation 122 of the rotor 106.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A cleaning fan for use in a cleaning system of a fruit harvester, comprising:
   a housing; and
   a rotor disposed within the housing, the rotor including a hub and a plurality of blades,
   wherein the hub is a frustroconical shaped hub with an axis of rotation, a smaller diameter inlet end, and a larger diameter outlet end,
   wherein each of the blades is attached to the hub and curves from the inlet end toward the outlet end, relative to a direction of rotation of the rotor, whereby air is blown during operation both axially and radially,
   wherein the housing includes an inlet and an outlet, and wherein an air flow through the cleaning fan at each of the inlet of the housing and the outlet of the housing is approximately parallel to the axis of rotation of the hub, and
   wherein the housing further includes a circular shaped inlet and an annular shaped outlet.

2. The cleaning fan of claim 1, wherein each of the blades has a proximal end attached to the hub near the inlet end, and each of the blades curves in a radial manner toward the outlet end.

3. The cleaning fan of claim 2, wherein each of the blades terminates near the outlet end of the hub.

4. The cleaning fan of claim 1, wherein each of the blades curves as a continuous curve or has a plurality of adjoining discrete curve segments.

5. The cleaning fan of claim 1, wherein each of the blades rotates through between 75° to 90° of rotation, measured on a radial coordinate system and viewed parallel to the axis of rotation of the hub.

6. The cleaning fan of claim 1, wherein each of the blades has an inlet angle of between 40° to 50°, and an outlet angle of between 40° to 55°, relative to and viewed orthogonal to the axis of rotation of the hub.

7. The cleaning fan of claim 1, wherein the rotor has a hub expansion ratio of between 2.6:1 and 2.8:1, and the blades have a contraction ratio of between 1.75:1 and 1.95:1.

8. The cleaning fan of claim 1, wherein the cleaning fan operates at a noise level of 75 to 85 dB.

9. The cleaning fan of claim 1, wherein the housing is configured as a two part housing including an inlet housing portion with the inlet of the housing and an outlet housing portion with the outlet of the housing.

10. The cleaning fan of claim 9, wherein the outlet housing portion includes an inner annular housing part which lies closely adjacent to the larger diameter outlet end of the hub, and an outer annular housing part which is concentric with the inner annular housing part and defines an annular shape of the outlet of the housing.

11. The cleaning fan of claim 9, further comprising a material shredder located near the inlet of the housing.

12. The cleaning fan of claim 11, wherein the material shredder is either a) coupled with and driven by the hub, or b) detached and separately driven from the hub.

13. A cleaning system of a fruit harvester, comprising a cleaning fan according to claim 1.

* * * * *